INVENTOR.
Kenneth E. Wood,
BY
Attys.

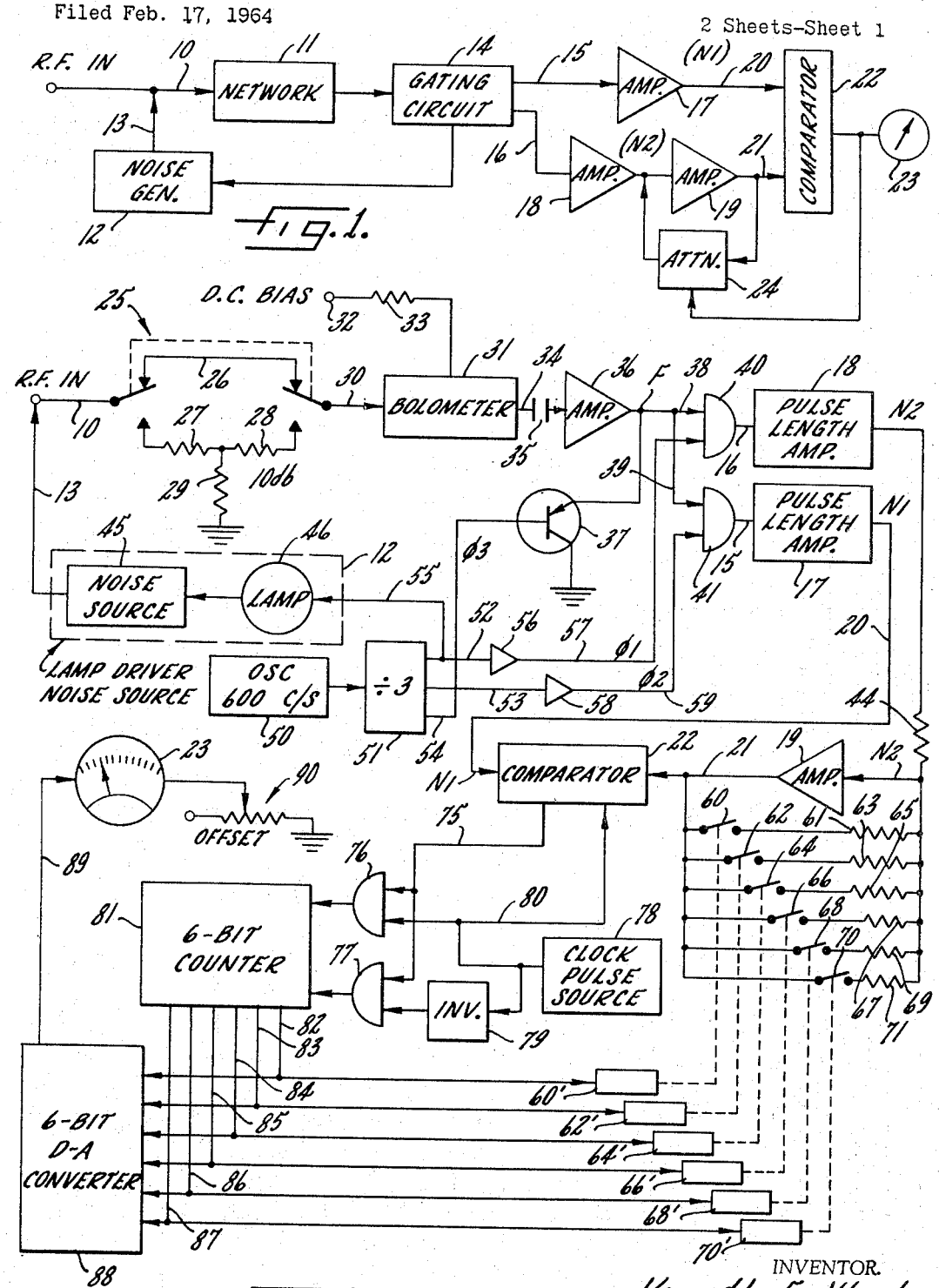

United States Patent Office 3,351,853
Patented Nov. 7, 1967

3,351,853
AUTOMATIC NOISE FIGURE METER
Kenneth E. Wood, Severna Park, Md., assignor, by mesne assignments, to the United States of America as represented by the Secretary of the Navy
Filed Feb. 17, 1964, Ser. No. 345,541
13 Claims. (Cl. 324—57)

ABSTRACT OF THE DISCLOSURE

An automatic noise figure meter for microwave radio frequency systems having an injected noise source of known decibels into the radio frequency with gating means to gate the system noise plus the injected noise and to gate the system noise into a comparator operative to produce a negative feedback to an amplifier in the circuit of the system noise to the comparator, the negative feedback amount necessary to equalize the system plus injected noise with the injected noise being metered to indicate the system noise.

Background of the invention

This invention relates to the measurement of noise and more particularly to a means of automatically monitoring the noise levels of a microwave system alone and of the microwave system with a known injected noise and comparing same to produce a noise figure or factor representative of the microwave system noise.

There have been many devices produced for measuring radar and radio receiver noise. Some of these devices are merely radio frequency (RF) noise sources that may be coupled for a time to the RF input or constructed to apply the noise frequency to the antenna of the system for which noise measurements are being made. Some radar devices are known to have auxiliary noise sources coupled and decoupled by multivibrators to provide some theoretical figure of noise produced entirely by the radar or radio system. Many of these noise measurement devices disable the radar or radio equipment during the noise measurement test or introduce factors limiting the use of the equipment. There is an ever present need to measure the noise figure of radar target detection equipment being used in order to evaluate radar operation in what may appear as countermeasures environment without disabling or limiting the detection capabilities too long. A fully automatic noise measuring means is accordingly very desirable where detection capabilities of the system are not hampered.

Summary of the invention

In this invention the RF signals including noise therein to be measured are applied to a network to which is also applied injected poise of known noise power. A gating circuit means gates the noise source "on" and "off" to the network and also gates the output of the network into two channels, one of which conducts signals for the RF noise source and the injected noise and the other channel of which conducts only the RF signal noise. The signals in the two channels are amplified and conducted to a comparator circuit to compare the noise in the source of the RF system with the combined source of the noise in the RF and the injected known noise to produce a compared output. One amplifier in the channel conducting the system noise and injected noise has an attenuated feedback, the attenuation of which is controlled by the comparator output to make the injected noise peak amplitude equal to the system noise. The comparator output, which is necessary to produce this equality, is measured and establishes a noise figure for the RF system noise as an indication in decibels (db) of the noise level in the RF system applied to this noise figure monitor. It is therefore a general object of this invention to provide a noise figure monitor circuit which will automatically measure the noise figure of unknown noise in an RF signal system by comparison with known injected noise.

Brief description of the drawings

These and other objects and the attendant advantages, features, and uses will become more apparent to those skilled in the art as the description proceeds when considered along with the accompanying drawings, in which:

FIGURE 1 is a simplified circuit schematic of the noise figure monitor circuit;

FIGURE 2 is a circuit schematic, partially in block diagram, of the simplified circuit shown in FIGURE 1;

Description of the preferred embodiment

Figure 3:
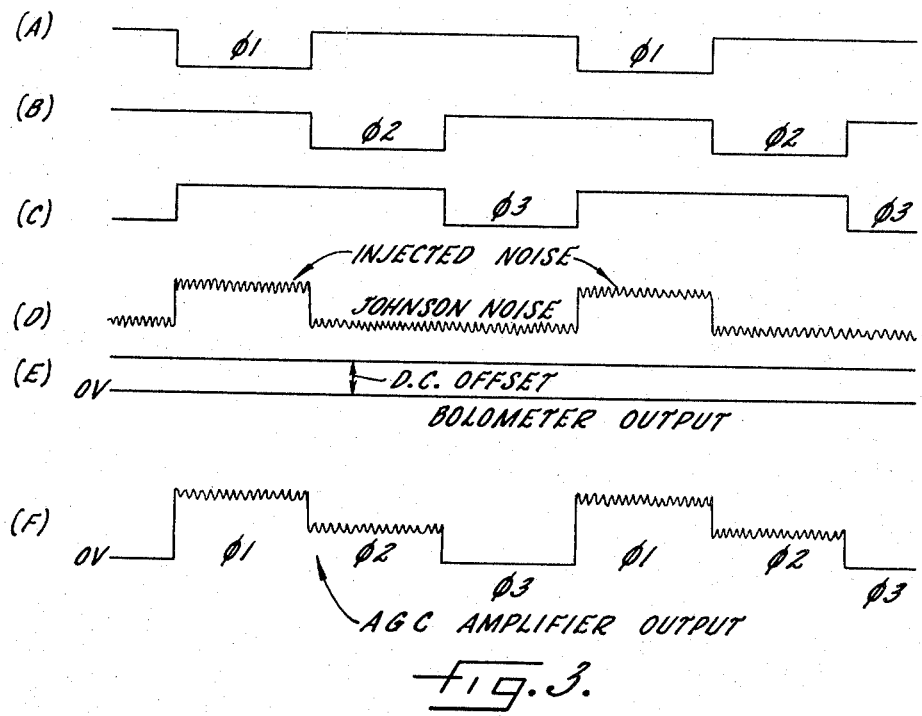
FIGURE 3 illustrates several waveforms which occur at various points in the circuit of FIGURE 2.

Referring more particularly to FIGURE 1, the RF input from the system, such as a radar system or the like, is applied by way of conductor 10 to a network 11. A noise generator 12 is coupled to apply noise frequency by way of conductor 13 or other means to the conductor 10, or to an antenna input to the RF system such that the noise frequency will likewise be coupled by way of conductor means 10 to the network 11. The output of network 11 is coupled to a gating circuit and gate driving means 14 to gate the network 11 output into two channels 15 and 16. The gating circuit and gate driving means 14 is likewise coupled to the noise generator 12 to gate the noise frequency "on" and "off." For the purpose of illustration and understanding let it be assumed that noise signal, which are produced only in the RF input as from a radar system or the like and constituting what is known as "Johnson noise," will be represented by reference $N_1$. This $N_1$ Johnson noise will be applied on the output 15 of the gating circuit 14 only. Let it further be assumed that the Johnson noise and the noise injected by the noise generator 12 will be gated over the output 16 as $N_2$. The output 15 for noise $N_1$ is coupled through a pulse length amplifier 17 while the output 16 for noise $N_2$ is coupled through pulse length amplifier 18 and a negative gain digitally controlled amplifier 19. The outputs from the amplifiers 17 and 19 are coupled by way of conductor means 20 and 21, respectively, to a comparator circuit 22, the output of which is measured by a meter 23. The amplifier means 19 in the noise channel $N_2$ has an attenuator 24 in a feedback circuit, the attenuator 24 of which is controlled by the output of comparator 22 to maintain the outputs 20 and 21 equal. The meter 23 will thereby register the noise figure or factor of the Johnson noise as will be derived and made clearer hereinbelow.

Let it be assumed that the following factors have the following equalities of known characteristics. Let:

$N_1$=the noise power out (Johnson noise)
$N_2$=noise power out with noise injected
$K_1$=Boltzmann's constant
$K_2$=injected noise temperature ratio
$G$=the network gain
$T$=absolute temperature
$B$=bandwith
$F$=noise factor From the above definitions:

$$N_1 = FK_1 TBG \quad (1)$$

and, $$N_2 = FK_1 TBG + K_2 K_1 TBG \quad (2)$$

or, $$N_2 = N_1 + K_2 \frac{N_1}{F}$$

Since $$\frac{N_1}{F} = K_1 TBG$$

from Equation 1 and, $$N_2 - N_1 = K_2 \frac{N_1}{F}$$

then, $$F = \frac{K_2}{\frac{N_2 - N_1}{N_1}}$$

and, $$F = \frac{K_2}{\frac{N_2}{N_1} - 1} \quad (3)$$

This may be equated thus:

$$\log_{10} F = \log_{10} K_2 - \log_{10} \frac{N_2 - N_1}{N_1}$$

Now let $$N_2 = YN_1 \ (Y = Y \text{ factor method}) \quad (4)$$

or, $$\frac{N_2}{N_1} = Y \quad (5)$$

Repeating Equation 3

$$F = \frac{K_2}{\frac{N_2}{N_1} - 1}$$

Substituting, $$F = \frac{K_2}{Y - 1} \quad (6)$$

Figure 4:
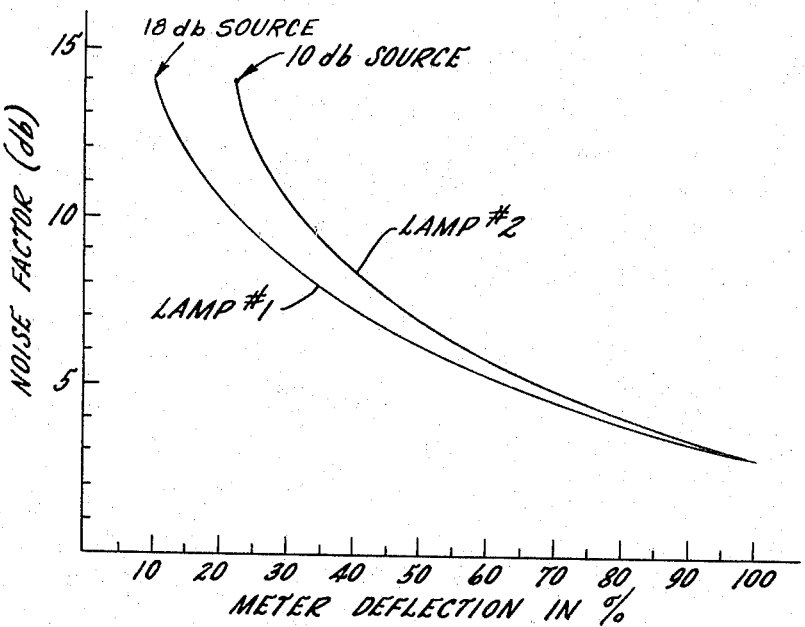
FIGURE 4 is a graph of the noise factor or figure in db along the ordinate axis as compared wtih the meter deflection in percentage along the abscissa.

If $K_2$ is known, the system noise figure reading from meter 23 can be obtained in db from a graph as shown in FIGURE 4 and which will be explained further hereinbelow.

Referring more particularly to FIGURE 2 wherein like reference characters will be applied as were used in FIGURE 1 and with occasional reference to FIGURE 3, the RF input from a radar system, or the like, is applied over the conductor means 10 to the switch blade of a twin, double-pole single-throw switch 25 which has the two upper contacts directly coupled by conductor means 26 and the two lower contacts coupled through resistors 27 and 28 in series with the junction of these two resistances coupled through a resistance 29 to a neutral or ground potential. The switch 25 is actuable for attenuating input signals over the conductor means 10 by 10 db. The output of the attenuator 25 is by way of the conductor means 30.

The network 26 through 29 corresponds to network 11 in FIGURE 1 and is for a particular application. The resistance network 27, 28, and 29 could be eliminated entirely and the conductor 26 permanently connected to connect the RF component to the conductor means 30.

A bolometer 31 receives the RF and noise signals over the conductor means 30, this bolometer being biased from a DC bias source at terminal 32 through a biasing resistor 33 in a manner well understood in the art. The bolometer 31 operates as a detector circuit to produce detected video signals on the output 34 thereof proportional to the square of the RF input at 30. Bolometer 31 may be of a standard type to perform these detector functions as may be more fully described in the text, Introduction to Microwave Energy, Application Note 46 by the Hewlett-Packard Company, 1960, Section 4, pp. 25 and 26.

The output 34 of the bolometer 31 is coupled through a capacitor 35 to an amplifier 36, the output of which is to the emitter of a transistor clamp 37 and which is to branch conductors 38 and 39 applied as one input to each of two "and" gates 40 and 41. The pulse length amplifier 18 and the negative gain digitally controlled amplifier 19 are in the circuit 21 to the comparator 22 from the "and" gate 40 output 16. Noise signals $N_2$ are gated through the "and" gate 40, through pulse length amplifier 18, through a resistor 44, and through the digitally controlled amplifier 19, to the comparator 22. Likewise, noise signals, such as Johnson noise, are gated by the "and" gate 41 through the pulse length amplifier 17, over the conductor means 20, to the comparator 22.

The noise generator 12 of FIGURE 1 includes a noise source 45 actuated by a discharge type lamp 46, the output of noise source 45 being by way of conductor means 13 or other means to inject the noise signals on the input conductor 10 to the meter circuit. The pulse repetition frequency of the noise source 45 is about 200 cycles per second, depending on the lamp 46 response. Such a lamp driving noise source is more fully described in the text, Electronic Measurements, Second Edition, by Terman and Pettit, 1952, in Section 8–16, p. 376, and will not be more fully described herein.

An oscillator 50 is provided to produce, for example, oscillations for about 600 cycles per second which are divided into three equal output phases by a division circuit 51 over outputs 52, 53, and 54. This provides an output for 33⅓ percent of the time for each of the three outputs 52, 53, and 54. The output phase $\phi 1$ over 52 is coupled by branch conductor 55 to the lamp 46 in the noise generator 12 to excite the lamp 46 to produce noise frequency in the noise source 45. The output phase $\phi 1$ over 52 is likewise amplified in an amplifier 56 and applied over the conductor means 57 as the second input to the "and" gate 40. Output phase $\phi 2$ over 53 is coupled through an amplifier 58 and by way of conductor means 59 as the second input to "and" gate 41. Output phase $\phi 3$ over 54 is coupled to the base of the transistor clamp 37, the collector of which is coupled directly to neutral or ground potential, thus providing a unidirectional output. It may be seen that for one-third of the output time of the oscillator 50 the noise source 12 is energized to produce noise of predetermined power over the output 13 to be injected in the RF input 10 which is conducted through the attenuator switch 25 and detected in the bolometer circuit 31. Bolometer output 34 is amplified in amplifier 36 and applied to both "and" gates 40 and 41. "And" gate 40 is enabled to conduct the RF input noise and the injected noise therethrough as noise $N_2$, but "and" gate 41 is inhibited since the phase $\phi 2$ output over 53 is nonexistant. During the one-third of the time that the phase $\phi 2$ output 53 is operative to enable "and" gate 41, the noise source 12 is cut off and the output from the network including the attenuator 25, bolometer 31, and amplifier 36, is gated through "and" gate 41 as video Johnson noise $N_1$ to the comparator 22 since the "and" gate 40 is now cut off by the absence of the phase $\phi 1$ signal. During phase $\phi 3$ output of 50 and 51 transistor clamp 37 is rendered conductive to conduct the output of the network from amplifier 36 directly to ground. A clear understanding of this function of the circuit may best be understood by reference to FIGURE 3 in which waveforms (A), (B), and (C) illustrate the three phases $\phi 1$, $\phi 2$, and $\phi 3$ of operation, the outputs of the components 50 and 51 which produce on the output F of amplifier 36 the waveform illustrated in FIGURE 3(F). Waveforms (D) and (E) of FIGURE 3 illustrate the injected noise and the Johnson noise being applied through the network 11 and the direct current offset in the bolometer 31 which is overcome by the three-phase output of the components 50 and 51.

The digitally controlled amplifier 19 is illustrated as having a plurality of feedback circuits through parallel circuits of a switch and a resistance in series, as illustrated by the switch and resistance 60 and 61, respectively, in one series circuit. Other switches 62, 64, 66, 68, and 70 are in series with resistors 63, 65, 67, 69, and 71, respectively, all switch and resistance elements in series being in parallel with the input and output of the amplifier 19. The resistances 61, 63, 65, 67, 69, and 71 have values which vary the steps of negative gain in the amplifier 19 and switches 60, 62, 64, 66, 68, and 70 have switch actuator means 60', 62', 64', 66', 68', and 70' to close the respective switches when energized.

The output of the comparator 22 is by way of conductor means 75 in parallel as one input to each of two "and" gates 76 and 77. The second input to each of the "and" gates 76 and 77 is from a clock pulse source 78, the input from the clock pulse source 78 being directly to "and" gate 76 while this input to the "and" gate 77 is through an inverter 79. The output of the clock pulse source 78 is also coupled as an input to the comparator 22 by way of the conductor means 80 to perform comparison during the application of each clock pulse. The outputs of each of the "and" gates 76 and 77 are to a six-bit digital counter 81, the output from the "and" gate 76 being coupled to cause the counter 81 to count forward while the output of the "and" gate 77 will cause the counter 81 to count backward. If $N_1$ power is less than the power of $YN_2$, where Y is the negative gain control factor of the amplifier 19, the comparator 22 will produce positive output pulses applicable through the "and" gate 76 to cause the counter 81 to count forward; while, if $N_1$ is greater than $YN_2$, a negative output from comparator 22 will be applied through the "and" gate 77 to cause counter 81 to count backward. That is, if $YN_2$ is greater than $N_1$, a positive output pulse from the comparator 22, for example, will be applied over the conductor means 75 to the "and" gate 76 along with the clock pulse 78 to gate the pulse through to the counter 81 to cause it to advance in digital count. On the other hand, if $N_1$ is greater than $YN_2$, a negative output pulse from comparator 22 over the output conductor 75 will be applied to the "and" gate 77 along with the negative clock pulses from 78 to gate through these pulses to the counter 81 to cause it to reverse count. The six-bits of the counter 81 are applied over the outputs 82, 83, 84, 85, 86, and 87, to the switch actuators 60', 62', 64', 66', 68', and 70', respectively, to set the switches 60, 62, 64, 66, 68, and 70, to establish the negative gain in accordance with the Y factor of the circuit. The digital bit outputs 82 through 87 from the counter 81 are applied likewise through a digital-to-analog converter network 88, the output being over a single conductor means 89 to the meter 23. The meter 23 has an offset control 90 for the purpose of zeroing the meter in the presence of bias voltage applied thereto from the converter 88.

Referring more particulary to FIGURE 4 there is illustrated a graph with the abscissa showing the meter deflection in percent and the ordinate showing the noise factor in db. This graph provides curves for two lamps number 1 and number 2 which may be used as a lamp source 46 in FIGURE 2, one being a 10 db source and the other being an 18 db source. For a particular application with a minimum noise lever of 3 db and a maximum noise level of 14 db, the meter 23 can be calibrated in db as shown by this illustration in FIGURE 4. For example, for lamp number 1 if there is a meter deflection of 65%, the noise figure will be 5 db.

Operation

In the operation of the device, particularly as illustrated in FIGURE 2, let it be assumed that the attenuator switch 25 is thrown to the upper contacts, as illustrated, to pass RF frequency signals directly to the bolometer 31 without attenuation. In the phase $\phi 1$ operation of the components 50 and 51 noise from the noise source 45 will be injected along with the Johnson, or system noise, and these noise frequencies will be detected to produce video signals on the output 34 which will be amplified in 36 and applied to both "and" gates 40 and 41. Since "and" gate 40 only has the phase $\phi 1$ output of the components 50 and 51 applied thereto, this "and" gate will pass the system noise and the injected noise as $N_2$ through the pulse length amplifier 18 and through the digitally controlled amplifier 19 as one input to the comparator 22. On the phase $\phi 2$ output of components 50 and 51, with phase $\phi 1$ now cut off, "and" gate 41 will be closed to pass Johnson noise video signals $N_1$ from the network to the comparator 22 since the noise source 45 is now cut off. The output of each gate is proportional to the amplitude of the injected and Johnson noise, respectively. Since the amplifiers 17 and 18 lengthen the video signal pulses, these pulses are of an extent in substantially direct current voltage to be compared in the comparator circuit 22 as clock pulses from the pulse source 78 are applied. The amplitude $N_2$ is then proportional to the injected noise and the amplitude $N_1$ is proportional to the Johnson noise. The video noise $N_2$ will logically be greater than the Johnson noise $N_1$ which will produce a positive output from comparator 22, for example, to cause the counter 81 to count upward to produce bit outputs over 82 through 87 to actuate the relay switches 60–60', 62–62', etc., in the negative feedback circuit of the digitally controlled amplifier 19 to cause the input $N_2$ from the amplifier 19 to become equal to the input $N_1$ on the comparator 22. The amplifier 19 divides $N_2$ by the factor Y to equate it with $N_1$. This digital output from the counter 81 is representative of the Y factor in the Equation 6 hereinabove, which Y factor is measured by the meter 23 through the digital-to-analog converter 88 since the power of the noise source is known, or the value $K_2$ is known. The meter 23 gives a reading proportional to the Y factor and the noise figure in db can be readily computed from FIGURE 4 by the reading taken from the meter 23. If at any time $N_1$ becomes greater than $YN_2$, the output pulse from comparator 22 over the output lead 75 will be gated through "and" gate 77 to cause counter 81 to reverse count until $N_2=YN_1$ and thereby establish the Y factor readout. In this manner the noise figure for any RF equipment may be established automatically and during the operation of the RF equipment without interference thereto so that the RF equipment will not have any substantial down time during operational periods.

While many changes and modifications may be made in the constructional details and features of this invention without departing from the spirit of monitoring noise signals, it is to be understood that I desire to be limited in the scope of my invention only by the scope of the appended claims.

I claim:
1. An automatic noise figure meter for microwave systems comprising:
an input;
a radio frequency source including microwave system noise coupled to apply radio frequency signals to said input;
a noise signal source coupled to apply noise signals to said input;
a detector means coupled to said input to detect said radio frequency with said system noise and said noise signals;
a comparator coupled to receive detected radio frequency with system noise signals from said detector and to receive detected radio frequency signals with system noise and detected noise signal from said noise source;
switching means coupled to said noise signal source and between said detector and comparator to switch said noise signal source "on" and "off" simultane- ously with switching of the detected frequency signals with system noise and the detected frequency signals with system noise and said detected noise signals to said comparator; and a means indicating the comparator output to produce a noise figure of the noise in the microwave system.

2. An automatic noise figure meter for microwave systems comprising:
   a detector means for detecting radio frequency with system noise signals and noise signals;
   an input means coupled to said detector means;
   a radio source including microwave system noise coupled to apply radio frequency signals to said input means;
   a comparator having two inputs and an output;
   a noise generator coupled to apply noise signals to said input means;
   gating means coupled to said noise generator and to the detector means and comparator for gating noise signals to said radio frequency input simultaneously with the gating of detected system noise and noise signals to one input of said comparator in one gated condition and for gating system noise to the other input of said comparator in another gated condition; and
   a means indicating the comparator output to provide a noise figure of the noise in the microwave system.

3. An automatic noise figure meter for microwave systems comprising:
   a detector means for receiving radio frequency on an input thereof and producing video signals therefrom on an output thereof, said input for radio frequency having microwave system noise inherent therein to produce system video noise signals on said output;
   a pair of "and" gates, each having two inputs and one output, one input of each being coupled to said detector means output;
   a noise generator coupled to apply noise frequency to said detector input to detect generated video noise on the detector output;
   gate driving means having a first output coupled to said noise generator and to the other input of one of said "and" gates to cause said noise generator to produce noise frequency and to gate said one "and" gate to pass detected video system noise and generated video noise to the output thereof, and having a second output coupled to the other input of the other "and" gate to pass system video noise to the output thereof;
   a comparator having two inputs coupled one each respectively to the outputs of said one and said other "and" gates to compare the system video noise and the generated video noise on an output thereof;
   an amplifier in the coupling of said one "and" gate output and said comparator input with a variable gain negative feedback;
   a pulse source coupled to said comparator;
   digital counter means coupled to the output of said comparator to count comparisons in accordance with said pulsed source, the output of said counter being coupled to the variable gain negative feedback of said amplifier to vary the gain of the amplifier until the comparator inputs are equal; and
   an indicator to register the counter output providing the noise figure of the microwave system.

4. An automatic noise figure meter as set forth in claim 3 wherein
   said gate driving means is a frequency source of at least two phases in which said first output is one phase output and in which said second phase is another phase output.

5. An automatic noise figure meter as set forth in claim 4 wherein
   said noise generator is a lamp used to excite a noise source.

6. An automatic noise figure meter as set forth in claim 5 wherein
   said digital counter means coupled to the output of said comparator to count comparisons in accordance with said pulsed source includes a clock pulse source coupled to said comparator; and
   said coupling of said comparator and counter means includes a pair of "and" gates in parallel with one each of two inputs, the second input of one "and" gate being coupled to said clock pulse source and the second input of the other of the "and" gates being coupled to the clock pulse source through an inverter.

7. An automatic noise figure meter for microwave system comprising:
   a detector and an automatic gain control amplifier in series, said detector having an input of radio frequency from a microwave system and said automatic gain control amplifier having an output;
   first and second "and" gates and a transistor clamp, each having a first input coupled in common to said amplifier output, each having a second input, and each having an output, the output of said transistor clamp being coupled to neutral potential;
   a noise source having a control input and an output coupled to inject noise frequency to the detector input;
   a frequency source divided into three output phases, one phase output being coupled in common to the control input of said noise source and to the other input of said first "and" gate, the second phase output being coupled to the other input of said second "and" gate, and the third phase output being coupled to the second input of said transistor clamp;
   a comparator having first and second inputs, a clock pulse input, and an output, one of said inputs being coupled to the output of said first "and" gate through a pulse length amplifier, and the other input being coupled to the output of said second "and" gate through a pulse length amplifier and a digitally controlled variable gain amplifier;
   a digital counter having one input for forward count, another input for reverse count, and a plurality of outputs coupled to control said variable gain amplifier to cause and maintain said comparator inputs to be equal;
   third and fourth "and" gates having one input of each coupled to the output of said comparator, another input of each coupled to a clock pulse source with the clock pulse coupling to said fourth "and" gate being through an inverter, said comparator having the clock pulse source coupled to said clock pulse input of said comparator to produce positive and negative compared output pulses corresponding to the comparison of system noise and injected noise, and said third and fourth "and" gates each having an output coupled to said digital counter inputs for forward and reverse counts, respectively; and
   indicator means coupled to said plurality of counter outputs to indicate the noise figure amounting to the digital value required to maintain the system noise and the injected noise inputs to said comparator at equal values.

8. An automatic noise figure meter as set forth in claim 7 wherein
   said transistor clamp is a transistor with the first input being the emitter, with the second input being the base, and with the output being the collector.

9. An automatic noise figure meter as set forth in claim 8 wherein
   said frequency source divided into three output phases consists of an oscillator to generate a voltage frequency and a network to divide the oscillator output into three equally timed outputs.

10. An automatic noise figure meter for microwave systems comprising:
- a switchable attenuator, a bolometer detector, and an automatic gain control amplifier coupled in series from a radio frequency input for said switchable attenuator to the output of said automatic gain control amplifier;
- first and second "and" gates, each having two inputs and an output, one input of each said first and second "and" gates being coupled to said automatic gain control amplifier output;
- a transistor clamp having a base, an emitter coupled to said automatic gain control amplifier output, and a collector coupled to a neutral potential;
- a noise source having an energizing means and an output coupled to inject noise signals on said radio frequency input;
- a frequency source divided into three equal outputs, the first output being coupled in common to said noise source input and to the second input of said first "and" gate, the second output being coupled to the second input of said second "and" gate, and the third output being coupled to the base of said transistor clamp for clamping the automatic gain control output to neutral potential during the third phase;
- a comparator having a first input coupled to the output of said first "and" gate, a second input coupled to the output of said second "and" gate, a third input, and an output;
- third and fourth "and" gates, each having first and second inputs and an output, the first input of each being coupled in common to the comparator output;
- a clock pulse source having an output coupled in common to the third input of said comparator and to the second input of said third "and" gate and coupled through an inverter to the second input of said fourth "and" gate;
- a digital counter having a plurality of outputs, a first input coupled to the output of said third "and" gate to cause said counter to count forward, and a second input coupled to the output of said fourth "and" gate to cause said counter to count backward;
- a digitally controlled variable gain amplifier in the coupling of said first "and" gate and said comparator first input, said digital control being coupled to said counter output to cause said first and second inputs to said comparator to be of equal value;
- an indicator; and
- a digital to analog converter coupling the output of said counter to said indicator to indicate the noise figure of the radio frequency input for two selectable attenuated conditions whereby the decibel value of noise in a microwave system may be measured with respect to a predetermined injected noise value.

11. An automatic noise figure meter as set forth in claim 10 wherein
said noise source is energized by a lamp and wherein said frequency source divided into three equal outputs consists of an oscillator, the output of which is switched into three outputs in equal time division.

12. An automatic noise figure meter as set forth in claim 11 wherein
said digital counter is a six-bit counter.

13. An automatic noise figure meter as set forth in claim 12 wherein
said indicator varies in accordance with applied voltage and has an offset adjustment.

References Cited

UNITED STATES PATENTS

| | | | |
|---|---|---|---|
| 2,620,438 | 12/1952 | Cotsworth | 324—57 X |
| 2,891,217 | 6/1959 | Grieg et al. | 324—57 |
| 2,988,693 | 6/1961 | Billig et al. | 324—57 |
| 3,072,845 | 1/1963 | Bruck | 324—57 |

RUDOLPH V. ROLINEC, *Primary Examiner.*

E. E. KUBASIEWICZ, *Assistant Examiner.*